April 29, 1952 — N. J. CASERTA — 2,594,868

MILK BOILER WITH SAFETY LID

Filed May 5, 1949

INVENTOR.
NICOLAS J. CASERTA
BY
ATTORNEY

Patented Apr. 29, 1952

2,594,868

UNITED STATES PATENT OFFICE 2,594,868

MILK BOILER WITH SAFETY LID

Nicolás J. Caserta, Buenos Aires, Argentina

Application May 5, 1949, Serial No. 91,435
In Argentina August 19, 1948

2 Claims. (Cl. 126—384)

This invention relates to new and useful improvements in apparatus for boiling milk, and, more particularly, the aim is to provide a novel and valuable apparatus so functioning that when a selected quantity of milk is confined in a suitable receptacle or vessel and subjected to so high a degree of prolonged heat as to cause violent boiling of the contained lacteal fluid to an extent that portions of said fluid erupt above the liquid surface at high velocities, not only is none of the milk lost, but the treatment sought to be given to the lacteal fluid is of optimum beneficence.

The essential characteristic of the new apparatus is that, while the action and efficacy of a milk boiling operation are hastened and improved, overflow of the milk during its said violent agitation is prevented, without the aid of human vigilance or even attention in that regard.

A feature of the invention is an arrangement such that high velocity ejectments from the collection of milk are passingly confined and guided, at points suitably above the general top level of the boiling milk, so that said ejectments are thereby transformed into jets of rather considerable length, these jets consisting of vapor and milk-emulsion or foam all in such manner that the thus established long jets rise through the air above the apparatus to predetermine that by contact with the atmosphere the upwardly flung fluid is cooled and condensed intensely or at least so much as to attain a temperature for facilitating the return of the liquid content of the jets to said vessel. The jets are produced by the pressure built up in the interior of the vessel as a consequence of the high heat applied to the vessel for boiling the milk.

Another feature of the invention, in combination with that just summarized, is a suitably shaped metal mass or masses located above the main body of the vessel and within a cover for the latter, and so positioned that the jets, after breaking down at their upper termini by their own weight and therefore falling into said cover, splash onto and flow over said metallic mass or masses. The said metallic mass or masses may practicably subsist as a single mass, and this mass is preferably one of ring form; with said ring of a bulk, shape and of a material having a thermal conductivity such that its average over-all temperature rises very slowly during the first part of the boiling operation and hence during this period contributes to the further cooling of the jet resultants falling into the cover. At the same time said ring or equivalent adds its own weight to the cover, and thereby holds the cover on said vessel, while obviating the possibly dangerous and certainly troublesome expedient of having to latch or otherwise mechanically clamp the cover to the receptacle; this holding down of the cover on the vessel insuring against upthrow thereof by the pressure within the vessel. In regard to the just explained temperature-affecting function of said ring or equivalent, it is to be emphasized that, in milk boiling, I have found that acceleration of the rapidity of condensation of the flung up products of violent ebullition is all important.

A third feature of the invention, in combination with the two discussed above, is the shaping and relative great expanse of the top mouth of the vessel, and with these attributes such that with the jets caused to rise at exceedingly great velocities and to points high above their points of original establishment, the new apparatus may be of large liquid capacity yet nevertheless aided always to function perfectly.

Also, by the invention, a cover is provided which is not only, by its simplicity of structure, capable of being fabricated at small cost, but which renders feasible the easy and expeditious cleaning thereof.

The boiling of milk, in the various fields where such boiling is commercially necessary, presents special problems, that is, problems peculiar to milk. A milk boiler embodied as hereinabove explained, has, after practical tests, been found to meet these problems in an ideal way. Hence exactly such a boiler, in carrying out the invention for the boiling of milk, is recommended and preferred. However, despite the fact that the boiling of milk presents said special problems, all overcome by a boiler pursuant to the invention, the latter is not necessarily to be limited to the boiling of a lacteal fluid.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 2:
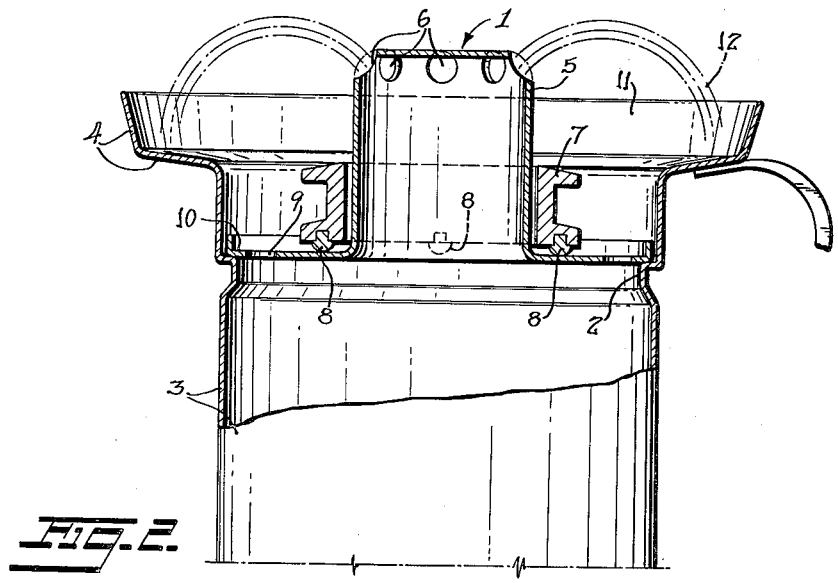
Fig. 2 is a view which in its upper portion represents a vertical section taken substantially on the line 2—2 of Fig. 1, and which in its lower portion elevationally shows a receptacle or vessel for containing the milk to be boiled; said vessel having its bottom broken away.
Figure 1:
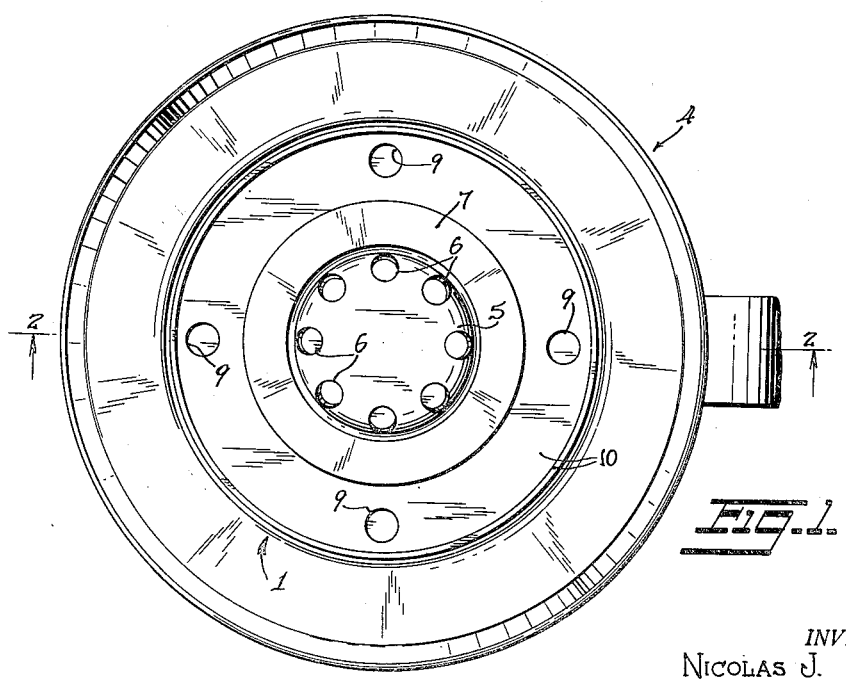
Fig. 1 is a top plan view of a now favored embodiment of a boiler according to the invention.

In order to obtain favorable results with milk boilers, it is necessary to insure the rapid cooling of the vapors which in the form of an emulsion or foam on the surface of the boiling milk liquid are erupted so rapidly that in the absence of such cooling such vapors would be lost against return to the vessel. The cooling effects condensation of the said vapors, and thus diminishes the volume of the emulsion, and so in turn insures that the latter in the form of a simple or normally fluent liquid will return to the vessel. In the situation described, the vapor given off by the milk is in a ratio of 1500 to 1 relative to the volume of liquid which is vaporized. This ratio gives an idea of the potentiality of the phenomenon, and just how efficacious any means to control an overflow must be. The milk boiling arrangements proposed in the past have usually consisted of a displaceable lid with a plurality of holes near the periphery of the lid and another hole in the center thereof; the theory being that the boiling milk would erupt through the central hole and thereafter return to the interior of the pot by way of the first-named series of holes, and during the travel of the milk over the lid and radially outwardly thereof toward said first-named series of holes the temperature of the thus flowing milky fluid would be enough lowered by the room temperature to effect a total or at least considerable condensation of its vaporous content. This arrangement, as is very well known, is not at all efficacious in actual practice, as the cooling effect obtained is generally insufficient, and overflow of the boiling milk cannot be prevented.

Referring, now, to the drawings in detail, the new cover 1 as herein illustratively shown incorporates a flat circular bottom wall, which adjacent to its circular periphery is to be seated on an annular shoulder 2 carried interiorly of the vessel 3. This vessel, below called the boiler, has said shoulder or equivalent suitably carried thereby, at some distance below the top of the boiler. At 4 is indicated the appreciable great enlargement of the mouth of the boiler, for, as already explained, participating in the correct functioning of the apparatus.

The cover 1, centrally thereof, has an upstanding dome-like portion, 5, provided with apertures 6, distributed around the crown of such dome; there being eight of these apertures in the dome illustrated.

The already mentioned single ring 7 forming a condensation hastening metallic mass is engaged about the dome-like portion 5. The metal used may be any suitable one, as aluminum, brass, etc. Desirably, and apparently for best results, this ring should have substantially the channel cross-section illustrated. For one thing, certainly, such a cross-section increases the area of the superficies of the ring over which the milky fluid dropped onto the ring 7 may flow, due to the surface tension of its liquid parts or particles, before leaving said member for arrival at the upper surface of the lid. Several, four as herein indicated, spacer feet 8 are suitably spaced around the bottom of the ring 7, to raise said member slightly above the bottom wall of the cover 1; these feet being desirably of a material of high heat-insulative property.

The cooled liquid leaving the ring 7, on reaching the several, herein shown as four, apertures 9, spaced circularly around the lid outwardly beyond the ring 7, flows downward through said apertures for return to the collection of boiling milk in the vessel 3. This described control of the milk arriving at the top of the lid's central portion is made possible, in the illustrated structure, by the presence of an upstanding flange 10 annularly surrounding said central lid portion; this flange also serving to increase the strength and rigidity of the lid.

The functioning of the apparatus is simple:

When the mixture of vapor and emulsion or foam at the surface of the boiling milk suddenly starts to rise, by the expanding force of the vapor, said mixture escapes upwardly first through the apertures 9 and at a later stage through the apertures 6. When the liquid reaches a certain level in the superior or larger upper subdivision 11 of the annular cavity surrounding the dome 5 and at the enlarged mouth of the vessel 3, the exits afforded by the apertures 9 become blocked by the overlying body of milk, and an impulse is imparted to the liquid to rise up as a central column high enough in said dome 5 to reach the apertures 6 and allow the same to function, as aforesaid, as passingly confining and guiding means for establishing the jets or sprays 12, said jets or sprays 12 being of more or less length before upper end attenuation and break down dependent on the intensity of the applied heat.

A continuous movement of liquid is thus effected, from the boiler to the lid through the upper apertures 6, and from the lid to the boiler through the lower apertures 9; whereby, and also due to the exposure of the jets or sprays of the liquid and subsequent over-the-lid condensations thereof to the air, the last-named condensations are not only initiated but initiatory condensations of the vapors are produced, or, in brief, a rapid dispersion of the heat which the boiler continues to receive is had. It is evident that on the magnitude of this heat dissipation depends the level of the liquid on top of the lid and the possibility of avoiding any overflow of the milk.

It is also evident that the metal ring 7 contributes to the rate of cooling down of the erupting of the liquid only at the very onset of the boiling, that is, at the most critical instant of the whole operation. In the case of slow and moderately applied heat, and a low room temperature, the ring 7 may be dispensed with, as sufficient cooling would be obtained by means of the jets and jet control described. In the latter case, the lid would have to be heavy enough to remain in place by its own weight, against the pressure exerted by the boiling milk; or, with the lid made of light weight material, and of the thin gauge indicated in the drawing, it would have to be mechanically latched or otherwise secured to the boiler, as in ordinary boilers.

On the other hand, and in another aspect of the invention, as under the above noted favorable conditions in regard to the applied heat and the then prevailing room temperature, the new lid, whether provided with the ring 7 or an equivalent, could be used efficaciously with any type of boiler. As a consequence, the lid per se is to be considered as a contribution novel and valuable in and of itself, and not necessarily as forming part of a combination another part of which is the boiler 3.

While I have illustrated and described the preferred embodiment of my invention, it is to be understood that I do not limit myself to the precise construction herein disclosed and the

Having thus described my invention, what I claim as new, and desire to secure by United States Letters Patent is:

1. A cover for use with a milk boiling vessel having an enlarged outwardly flared top portion and an inwardly directed annular shoulder spaced below the base of the outwardly flared top portion, said cover comprising a flat circular bottom wall rested at its periphery on the shoulder, an upstanding dome-like portion formed concentrically in said bottom wall, said dome-like portion being formed adjacent its crown with a plurality of apertures, said dome-like portion being tubular and opening at its bottom end through said bottom wall and communicating at its top end with said apertures, said bottom wall being formed with a plurality of apertures arranged in a circle arranged concentric with but spaced outward from the base of said dome-like portion, and a metallic ring engaged about said dome-like portion below its apertures and with its outer periphery spaced inward of the circle of apertures formed in said bottom wall, said ring being channel-shaped in cross-section with the open side of said channel facing radially outward.

2. A cover for use with a milk boiling vessel having an enlarged outwardly flared top portion and an inwardly directed annular shoulder spaced below the base of the outwardly flared top portion, said cover comprising a flat circular bottom wall rested at its periphery on the shoulder, an upstanding dome-like portion formed concentrically in said bottom wall, said dome-like portion being formed adjacent its crown with a plurality of apertures, said dome-like portion being tubular and opening at its bottom end through said bottom wall and communicating at its top end with said apertures, said bottom wall being formed with a plurality of apertures arranged in a circle arranged concentric with but spaced outward from the base of said dome-like portion, and a metallic ring engaged about said dome-like portion below its apertures and with its outer periphery spaced inward of the circle of apertures formed in said bottom wall, and feet on the bottom of said ring supporting said ring in a position raised off said bottom wall.

NICOLÁS J. CASERTA.

REFERENCES CITED

The following references are of record in the file of this patent:

UNITED STATES PATENTS

| Number | Name | Date |
| --- | --- | --- |
| 310,468 | Schimper et al. | Jan. 6, 1885 |
| 1,418,378 | Kania | June 6, 1922 |
| 1,505,980 | Stolitzka | Aug. 26, 1924 |
| 1,810,860 | Tremblay | June 16, 1931 |
| 2,127,988 | Tarrant | Aug. 23, 1938 |

FOREIGN PATENTS

| Number | Country | Date |
| --- | --- | --- |
| 764,780 | France | Mar. 12, 1934 |